United States Patent
Anantharaman et al.

(10) Patent No.: US 9,432,372 B2
(45) Date of Patent: Aug. 30, 2016

(54) ACCESS POLICY BASED ON COLLABORATION PARTICIPATION

(75) Inventors: Arun Anantharaman, Los Altos Hills, CA (US); Donald R. Walling, Jr., San Francisco, CA (US); Shashi K. Rai, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 563 days.

(21) Appl. No.: 12/695,856

(22) Filed: Jan. 28, 2010

(65) Prior Publication Data

US 2013/0145284 A1 Jun. 6, 2013

(51) Int. Cl.
*G06F 15/16* (2006.01)
*H04L 29/06* (2006.01)
*H04L 12/18* (2006.01)
*H04M 3/56* (2006.01)
*H04M 7/00* (2006.01)
*G06F 21/10* (2013.01)
*G06F 21/62* (2013.01)

(52) U.S. Cl.
CPC .............. *H04L 63/10* (2013.01); *G06F 21/10* (2013.01); *G06F 21/6218* (2013.01); *H04L 12/1822* (2013.01); *H04M 3/567* (2013.01); *H04M 7/0027* (2013.01); *H04L 65/403* (2013.01)

(58) Field of Classification Search
CPC ..................... H04L 29/06027; H01L 12/1822
USPC ......................................... 715/753, 750, 741
See application file for complete search history.

(56) References Cited

U.S. PATENT DOCUMENTS

| | | | |
|---|---|---|---|
| 6,286,034 B1 * | 9/2001 | Sato ........................ | G06F 9/54 709/204 |
| 7,554,576 B2 * | 6/2009 | Erol ................. | G06F 17/30244 348/159 |
| 7,581,244 B2 * | 8/2009 | Li ........................... | H04L 63/06 380/277 |
| 7,679,518 B1 * | 3/2010 | Pabla .................. | G06Q 10/109 340/309.16 |
| 7,711,384 B1 * | 5/2010 | Szuszczewicz ... | H04M 3/42365 379/202.01 |
| 7,835,510 B2 * | 11/2010 | Akachi .................... | H04N 7/15 379/202.01 |

(Continued)

*Primary Examiner* — Daeho Song
(74) *Attorney, Agent, or Firm* — Kilpatrick Townsend & Stockton LLP

(57) ABSTRACT

According to example configurations as described herein, an on-line conference management application receives an indication of multiple participants that attend an on-line collaboration meeting. The conference management system stores identities of content shared amongst the multiple participants during the on-line collaboration meeting. Based on identities of the multiple participants and shared content, the conference management system generates an access policy. Subsequent to termination of the on-line collaboration meeting, the conference management system utilizes the access policy to prevent unauthorized access to the shared content. For example, the conference management system can receive a request from a user to access the shared content. The management system checks to determine whether the user was a participant at the on-line collaboration meeting. Responsive to detecting that the user attended the on-line collaboration meeting as specified by the access policy, the management system can provide access to the particular document to the user.

22 Claims, 9 Drawing Sheets

(56) References Cited

U.S. PATENT DOCUMENTS

| | | | | |
|---|---|---|---|---|
| 7,941,752 | B2* | 5/2011 | Ozugur | H04L 63/102 379/90.01 |
| 8,886,719 | B2* | 11/2014 | Houghton | H04L 29/06027 709/204 |
| 2003/0167303 | A1* | 9/2003 | Zhu | H04L 12/1827 709/204 |
| 2003/0220973 | A1* | 11/2003 | Zhu | H04L 12/1831 709/205 |
| 2004/0059785 | A1* | 3/2004 | Blume | G06Q 10/109 709/206 |
| 2004/0103147 | A1* | 5/2004 | Flesher | G06F 17/30575 709/204 |
| 2005/0010639 | A1* | 1/2005 | Long | G06Q 10/10 709/204 |
| 2005/0131714 | A1* | 6/2005 | Braunstein | G06Q 30/02 709/204 |
| 2005/0132299 | A1* | 6/2005 | Jones | G06F 3/0481 715/759 |
| 2006/0224430 | A1* | 10/2006 | Butt | G06Q 10/063116 705/7.16 |
| 2006/0235851 | A1* | 10/2006 | Akachi | H04N 7/15 |
| 2006/0242581 | A1* | 10/2006 | Manion | G06Q 10/10 715/733 |
| 2006/0284981 | A1* | 12/2006 | Erol | G06F 17/30244 348/207.1 |
| 2007/0180503 | A1* | 8/2007 | Li | H04L 63/06 726/5 |
| 2008/0243852 | A1* | 10/2008 | Brunner | G06Q 10/10 |
| 2008/0256189 | A1* | 10/2008 | Lyle | H04L 12/581 709/206 |
| 2008/0263010 | A1* | 10/2008 | Roychoudhuri | G06F 17/30056 |
| 2009/0019367 | A1* | 1/2009 | Cavagnari | G06F 21/62 715/716 |
| 2009/0019526 | A1* | 1/2009 | Fukushima | H04L 12/1822 726/3 |
| 2009/0024439 | A1* | 1/2009 | Ryan | G06Q 10/06312 705/7.19 |
| 2009/0089683 | A1* | 4/2009 | Thapa | H04N 7/15 715/756 |
| 2009/0181659 | A1* | 7/2009 | Stalnacke | G06Q 10/1093 455/416 |
| 2009/0204678 | A1* | 8/2009 | Shah | G06Q 10/103 709/206 |
| 2009/0254615 | A1* | 10/2009 | Baliga | G06Q 10/109 709/204 |
| 2009/0300520 | A1* | 12/2009 | Ashutosh | H04L 12/1831 715/756 |
| 2010/0037151 | A1* | 2/2010 | Ackerman | G06Q 10/10 715/753 |
| 2010/0070640 | A1* | 3/2010 | Allen, Jr. | G06Q 10/10 709/229 |
| 2010/0146115 | A1* | 6/2010 | Bezos | H04L 67/06 709/225 |
| 2010/0235216 | A1* | 9/2010 | Hehmeyer | G06Q 10/109 705/7.26 |
| 2010/0235894 | A1* | 9/2010 | Allen, Jr. | H04L 12/1818 726/7 |
| 2011/0040834 | A1* | 2/2011 | Schaefer | G06Q 10/109 709/204 |

* cited by examiner

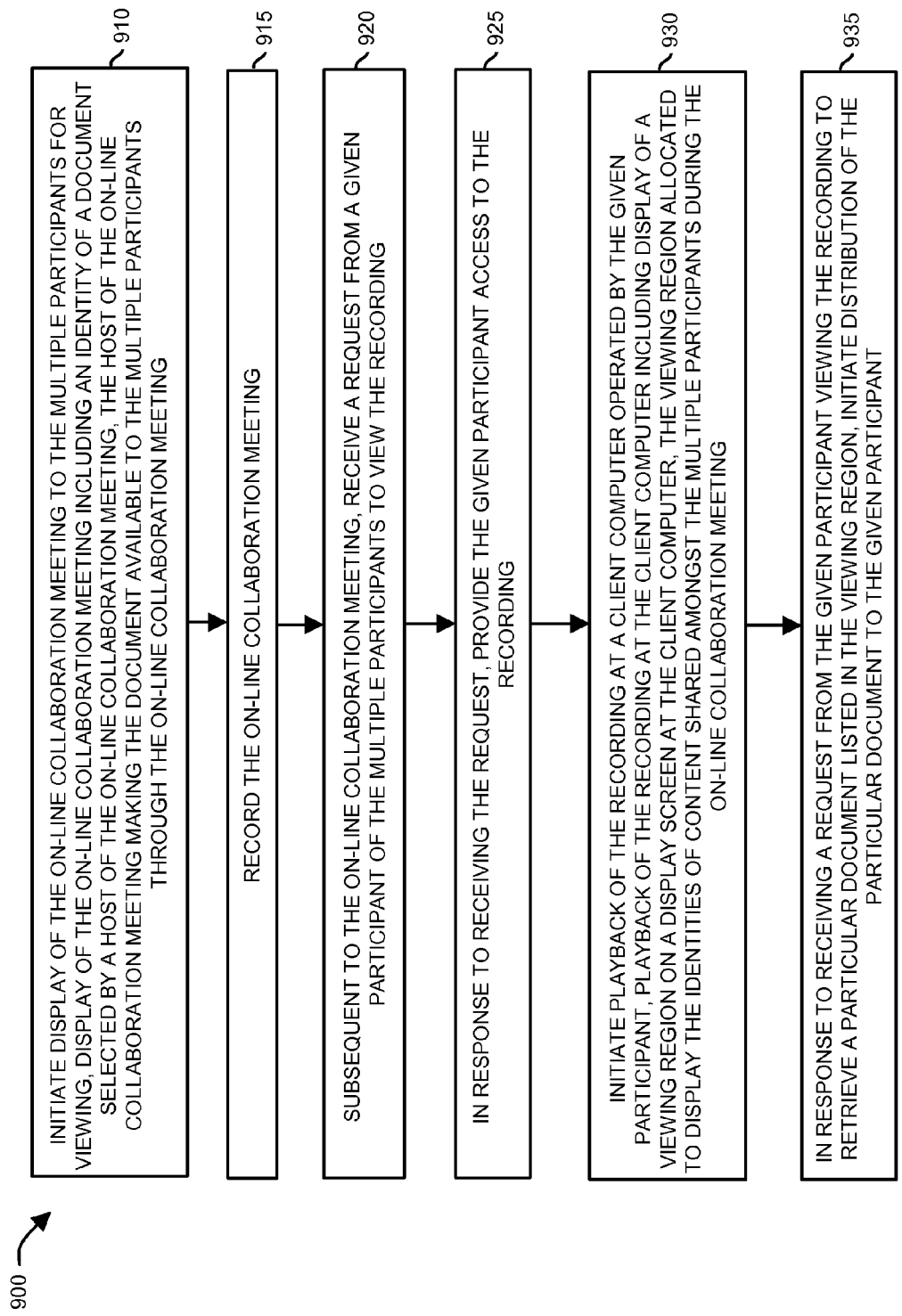

ACCESS POLICY BASED ON COLLABORATION PARTICIPATION

BACKGROUND

Conventional software applications enable on-line conferencing amongst multiple users. In certain cases, on-line conferencing is used to conduct live meetings, training, or presentations via communications over the Internet.

For example, a so-called "webinar" refers to a specific type of web conference. A webinar is typically one-way. That is, a presenter of the webinar creates a presentation that is distributed to and viewed by the participants of the webinar over the internet.

In certain cases, a webinar can be two-way in which the participants are able to communicate with a presenter. In a two-way webinar, the presenter is able to put on a presentation for viewing by each of the participants. In an opposite direction, the participants are able to communicate with the presenter. Accordingly, conventional webinars can support a dialog between multiple participants.

Other conventional web conferencing applications enable more advanced communications than the simplest type of webinars. For example, certain conventional on-line conferencing enables multiple participants to attend a conference meeting and share information with each other. In such system, a graphical user interface on a respective participant's computer can enable a respective participant to make content such as files, images, documents, etc., available to the other participants of the meeting. Accordingly, via the web conference, a respective participant can distribute content to other members attending the meeting.

BRIEF DESCRIPTION

Conventional on-line conferencing as discussed above can suffer from a number of deficiencies. For example, on-line conferencing enables participants to communicate with each other during a meeting and share information with each other. However, the information shared between participants of the meeting may be confidential and therefore require protection. A conventional server does not store copies of shared information. Accordingly, if a participant of a meeting would like to retrieve a document that was shared during the meeting, the participant must communicate with an originator of the content to obtain a copy. Thus, retrieval of content shared in an on-line collaboration meeting can be tedious to a participant since the participant must determine who has the document and then request a copy from an owner. Upon receipt of the request, the owner of the document has the burden of handling the request by sending a copy of the document to the participant.

Embodiments herein deviate with respect to conventional on-line collaboration techniques. For example, embodiments herein are directed to unique ways of managing rights to content shared during an on-line collaboration meeting.

More particularly, one embodiment herein includes management system operating in a network environment. The management system receives an indication of multiple participants attending an on-line collaboration meeting. The management system stores identities of content shared amongst the multiple participants during the on-line collaboration meeting. Based on identities of the multiple participants and identities of shared content, the management system generates an access policy. In one example embodiment, the access policy is available subsequent to termination of the on-line collaboration meeting.

The access policy as discussed herein can indicate identities of the multiple participants and the content shared amongst the multiple participants during the on-line collaboration meeting. Subsequent to termination of the on-line collaboration meeting, the access policy can be utilized to prevent unauthorized access to the shared content subsequent to the on-line meeting. For example, a meeting management system, or other resource providing access control via the created access policy, can receive a request from a first user to access a particular document shared during the on-line collaboration meeting. The management system checks to determine whether the first user was a participant at the on-line collaboration meeting. Responsive to detecting that the first user attended the on-line collaboration meeting as specified by the access policy, the management system provides access to the particular document to the first user.

The management system also can receive a request from a second user to access the particular document shared during the on-line collaboration meeting. Responsive to detecting that the second user did not attend the on-line collaboration meeting as indicated by the access policy, the management system can prevent the second user from accessing the particular document.

Accordingly, one embodiment herein includes tracking which persons participated in the on-line collaboration meeting and creating an access policy so that only participants of the on-line collaboration meeting can access the shared document. In other words, persons that did not attend the meeting can be prevented from accessing the content shared in the meeting even though the persons may have been invited to the on-line collaboration meeting.

In further embodiments, the management system can be configured to store status information associated with the multiple participants attending or who participated in the on-line collaboration meeting. First stored status information can indicate that a first participant is a direct invitee that was sent a link to attend the on-line collaboration meeting. The direct invitee may be afforded high-level privileges for viewing content shared in the on-line collaboration meeting. In certain cases, the direct invite can be allowed to retrieve and view the content shared in the on-line collaboration meeting, but a graphical user interface operated by the direct invite can prevent the direct invite from storing the shared content to a respective repository at the client computer without permission from the host.

Before the on-line collaboration meeting, the participant receiving the direct invite can forward the link to other possible participants. The other participants are guests. Via the link, the other participants can be afforded guest status for attending or participating in the on-line collaboration meeting. However, in accordance with settings as specified by the host of the on-line collaboration meeting, the guest participants may be assigned a lower privilege level for viewing content shared during the on-line collaboration meeting. In other words, the guests may be able to attend a meeting via use of the link, but may have only limited rights for viewing the shared content. Second stored status information can indicate that a second participant is a guest invited by the direct invite to attend the on-line collaboration meeting.

Thus, in accordance with embodiments herein, the shared content can be assigned access permission that is separate and distinct from a permission to attend the meeting.

As discussed below, the host of the on-line collaboration meeting can specify which persons are able to view the shared content during the on-line collaboration meeting or after the on-line collaboration meeting.

In furtherance of the example as discussed above, the management system can generate the access policy to indicate that the direct invite is afforded access to content shared during the on-line collaboration meeting and that the guest is prevented from accessing the shared content even though the guest may have attended the meeting. Accordingly, subsequent to the on-line collaboration meeting, the management system can receive a request from a first participant to access the content shared amongst the participants in the on-line collaboration meeting and, in accordance with the access policy, grant the first participant access to the content shared during the on-line collaboration meeting. In accordance with the access policy, the management system can deny a second participant access to the content subsequent to the on-line collaboration meeting even though the second participant attended the meeting.

An individual such as a host scheduling the on-line collaboration meeting can provide input specifying access privilege levels of the meeting attendees. In such an embodiment, the management system can receive input specifying which particular users are able to attend the on-line collaboration meeting. Additionally, the input can specify multiple different participant access levels to the content presented in the on-line collaboration meeting. For example, a first participant access level can enable a respective participant of the on-line collaboration meeting to retrieve and view any content that is shared in the on-line collaboration meeting, a second participant access level can enable a respective participant of the on-line collaboration meeting to retrieve and view only certain content shared in the meeting, a third participant access level can prevent a respective participant of the on-line collaboration meeting from retrieving and viewing the content shared in the meeting, and so on. Each of the first participant, the second participant, and the third participant can be invited to attend the on-line collaboration meeting. Accordingly, the individual such as a presenter managing or producing the on-line collaboration meeting can restrict access to content shared in the meeting. The shared content can include files, documents, images, etc., that are distributed to one or more of the participants during the on-line collaboration meeting as an attachment or other suitable form.

In another example embodiment, the meeting manager can specify that a particular group of persons are able to participate in the meeting and view the shared content. However, a privilege level assigned to the particular group for viewing the shared content after the on-line collaboration meeting can be restricted as discussed above. For example, although the particular group of persons is able to participate in the meeting and view the shared content during the meeting, such users can be prevented from viewing the shared content subsequent to the meeting. Accordingly, embodiments herein can include, during an on-line collaboration meeting, initiating display of content to a particular participant of the meeting. After the on-line collaboration meeting, the access can be used to prevent distribution of the content to the particular participant.

In other cases, the host can invite certain persons to the meeting. Those persons that do not attend the meeting may be allowed to view a recording of the meeting. However, because a particular invited person did not attend the on-line collaboration meeting at a particular time when it was presented, that user can be prevented from viewing or retrieving a copy of the shared content even though such a person may be allowed view the recorded meeting.

One type of content shared in the on-line collaboration meeting is content distributed by a presenter of the on-line collaboration meeting to the meeting participants. Another type of content shared in the on-line collaboration meeting is content distributed by meeting participants to other meeting participants or the presenter.

In one embodiment, the management system is a centralized server in a network that initiates display of the on-line collaboration meeting to the multiple participants for viewing. Display of the on-line collaboration meeting at client computers operated by the participants can include displaying a viewing region in a graphical user interface at the clients to indicate an identity of at least one document that is selected by a presenter and shared for viewing in the on-line collaboration meeting. The presenter in the on-line collaboration meeting can therefore make the at least one document available to the multiple participants through the on-line collaboration meeting. The management system can record the on-line collaboration meeting attended by the multiple participants. Subsequent to storing the on-line collaboration meeting, the management system can receive a request from a given participant of the multiple participants to view the recording. In response to receiving the request, the management system can provide the given participant access to the recording.

Providing access to the recording can include initiating playback of the recording at a client computer operated by the given participant. Playback of the recording at the client computer can include display of a viewing region on a display screen at the client computer. As mentioned, a designated viewing region can be used to display the identities of content shared amongst the multiple participants during the on-line collaboration meeting. Thus, a user viewing the recorded on-line collaboration meeting can be apprised of the different content shared during the meeting. In response to receiving a request from the given participant viewing the recording to retrieve a particular document listed in the viewing region, the management system can initiating distribution of the particular document to the given participant.

To notify one or more participant of the on-line collaboration meeting that shared is available for viewing, the management system can be configured to initiate distribution of a link to the multiple participants. The link can include an address from which to retrieve and view the recording of the on-line collaboration meeting. Accordingly, embodiments herein can further include, subsequent to the on-line collaboration meeting, initiating distribution of a link to the multiple participants, the link including an address from which to retrieve a recording of the on-line collaboration meeting and/or a link to the content shared during the on-line collaboration meeting. In response to receiving a request from a given participant to access the recording of the on-line collaboration meeting via the link, the management system can verify credentials of the given participant prior to distribution of the content shared during the on-line collaboration meeting.

In addition to, or as an alternative to, distributing the link to retrieve the recording, embodiments herein can include initiating distribution of a link specifying a location from which to retrieve the content shared during the on-line collaboration meeting. In this latter embodiment, the user can access the content shared in the meeting without having to retrieve the recorded on-line collaboration meeting.

Note further that a conference management system according to embodiments herein can, during or subsequent to an on-line collaboration meeting, prompt a host of the meeting for a listing of which of the multiple participants to provide access to the content shared in the meeting after the on-line meeting. Based on input from the host specifying the list, the conference management system generates the access policy to allow only the members on the list to access the shared content and/or recording of the on-line collaboration meeting. Thus, rules for generating the access policy can vary and access to shared need not be based only on whether a particular user attended an on-line collaboration meeting.

These and other embodiment variations are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as managing workflows. The instructions, when carried out by a processor of a respective computer device, cause the processor to: receive an indication of multiple participants attending an on-line collaboration meeting; store identities of content shared amongst the multiple participants during the on-line collaboration meeting; generate an access policy, the access policy indicating identities of the multiple participants and the content shared amongst the multiple participants during the on-line collaboration meeting; and utilize the access policy to prevent unauthorized access to the content subsequent to the on-line meeting.

The ordering of the steps has been added for clarity sake. These steps can be performed in any suitable order.

Other embodiments of the present disclosure include software programs to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems Incorporated of San Jose, Calif., USA.

As discussed above, techniques herein are well suited for use in software applications that facilitate execution of workflows and respective tasks by one or more resources. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 9 is a flowchart illustrating an example method related to generation of an access policy according to embodiments herein.

DETAILED DESCRIPTION

According to example configurations as described herein, a resource such as a conference management application receives an indication of multiple participants that attend an on-line collaboration meeting. The conference management system stores identities of content shared amongst the multiple participants during the on-line collaboration meeting. Based on identities of the multiple participants and identities of shared content, the conference management system generates an access policy. In an example embodiment, the access policy indicates identities of the multiple participants and the content shared amongst the multiple participants during the on-line collaboration meeting. Subsequent to completion of the on-line collaboration meeting, the access policy can be utilized to prevent/allow access to the shared content subsequent to the on-line meeting. For example, a conference management system, or other resource providing access control via the created access policy, can receive a request from a first user to access particular content shared during the on-line collaboration meeting. The management system checks to determine whether the first user was a participant at the on-line collaboration meeting. Responsive to detecting that the first user attended the on-line collaboration meeting as specified by the access policy, the management system provides access to the particular document to the first user. The conference management system can receive a request from a second user to access particular content shared during the on-line collaboration meeting. The conference management system can check to determine whether the second user was a participant at the on-line collaboration meeting. Responsive to detecting that the second user did not attend the on-line collaboration meeting or that the second user otherwise has restricted access rights as specified by the access policy, the conference management system prevents distribution of the shared content to the second user.

Figure 1:
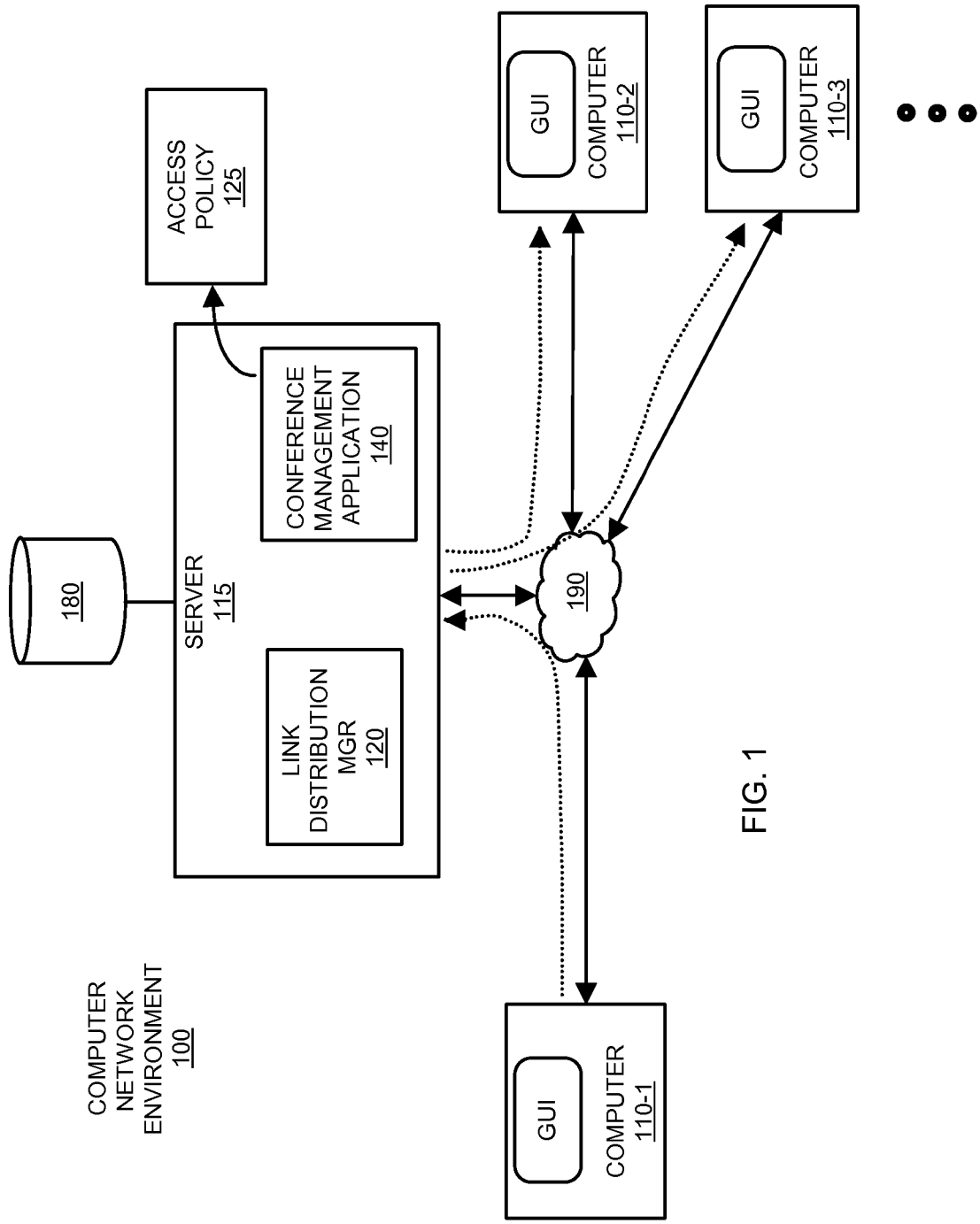
FIG. 1 is an example diagram of a computer environment supporting on-line collaboration meetings and generation of one or more access policies according to embodiments herein.

FIG. 1 is an example diagram of a computer network environment 100 supporting on-line collaboration meetings according to embodiments herein. As shown, computer network environment 100 includes multiple computers 110 (e.g., computer 110-1, computer 110-2, computer 110-3, etc.). Each of computers 110 can include a display screen, storage, connection to network 190, local processing capability, etc., such that the computers 110 can share content with each other during on-line collaboration meetings.

A host of a respective on-line meeting with computers 110-2, 110-3, etc., can operate a particular computer in computer network environment 100 such as computer 110-1. During operation, server 120 provides functionality enabling the host computer 110-1 to schedule, manage, and execute on-line meetings.

Initially, host computer 110-1 communicates with conference management application 140 at server 115 to schedule a respective on-line collaboration meeting. To schedule a meeting, host computer 110-1 provides information such as a time associated with the meeting, persons invited to the meeting, type of meeting, etc. The conference management application 140 can be configured to provide notification of the meeting to prospective participants.

In one embodiment, the host computer 110-1 provides permission information specifying an authorization level of each person invited to the meeting. Each authorization level can indicate what type of shared information in the on-line meeting can be viewed by the participants during the meeting. Accordingly, certain attendees of an on-line collaboration meeting can be assigned an authorization level enabling them to view any content shared during the on-line collaboration meeting, other attendees may be assigned a lower authorization level preventing them from viewing certain content shared during the on-line collaboration meeting.

As mentioned, the host of the on-line collaboration meeting can specify access levels of attendees before a respective meeting. However, in further embodiments, note that the collaboration system as discussed herein can be configured to allow the host or some other source to change access levels before, during, and/or after the meeting as well. For example, the host that changes the access level and privileges before, during, and/or after a meeting can be a person hosting the meeting, or a computer program that monitors the content of the meeting. Further, the source can be a person acting upon a recommendation from a computer program monitoring the meeting using embedded or configured rules. Further, the change to the access level can be effected either during the meeting in real time or upon automated or manual analysis of the content after the meeting. Accordingly, if a particular participant does not initially have rights to view certain content shared in the meeting, the host (or other authorized source) can modify the access rights during the meeting so that particular participant can then view shared content. Conversely, the collaboration system as discussed herein can enable the host (or other authorized source) to revoke access rights during the meeting such that a respective participant initially having access rights no longer has access rights to view certain content presented in the on-line collaboration meeting.

Server 115 can include link distribution manager 120. After scheduling of an on-line collaboration meeting by a host, the link distribution manager 120 provides notification to prospective attendees about the on-line collaboration meeting scheduled by computer 110-1. Notification can be achieved via any number of means such as e-mail, voicemail, etc. The link distributed by link distribution manager 120 can be a web address associated with server 115. Via the address in the distributed link, a respective user can communicate with server 115 and join an on-line collaboration meeting. A username and/or password may be required by the server 115 to join the on-line collaboration meeting executed by server 115.

Assume in this example that computer 110-1 is a host site of an on-line collaboration meeting and that each of multiple users at computer 110-2 and computer 110-3 have been invited to and attend the on-line collaboration meeting. In such an embodiment, during the on-line collaboration meeting, the host at computer 110-1 can present content for viewing by the meeting participants. By way of a non-limiting example, the host at computer 110-1 transmits the host's presentation to server 115. Server 115 distributes a rendering of the presentation to attendees at computer 110-2 and computer 110-3.

In one embodiment, the host of a meeting or other entity can make content available to the attendees of the on-line collaboration meeting. For example, in one embodiment, the host can drag and drop content such as a document, file, etc., into a region of a graphical user interface displayed on display screen at computer 110-1 to initiate distribution of the content to the participants of the on-line collaboration meeting. Distribution of content can include transmission of a copy of the content from computer 110-1 to the server 115 based on the dragging and dropping by the host. Subsequent to receipt of a command from computer 110-1 to distribute content, server 115 initiates distribution of the content to participants of the on-line collaboration meeting at computer 110-2, 110-3, etc. As previously discussed, the server 115 can selectively transmit the content to the different participants depending on access rights assigned by the host to the participants.

In further embodiments, if the meeting is so configured, note that the participants of the on-line collaboration meeting also can initiate distribution of content from a respective computer such as computer 110-2 to one or more other participants in the on-line collaboration meeting. For example, during the on-line collaboration meeting, the user at computer 110-2 can drag and drop a symbol representing content such as a file, document, image, slideshow, etc., into a designated viewing region of a respective display screen to distribute such information to other participants of the meeting. Thus, in certain embodiments, a user participating in the meeting at computer 110-2 can selectively distribute content to the other members of the on-line collaboration meeting.

Conference management application 140 of server 115 can be configured to generate one or more access policies for a respective on-line collaboration meeting. For example, the conference management application 140 can receive an indication of identities of multiple participants attending or who participated in an on-line collaboration meeting. In such an embodiment, the conference management application 140 stores identities of content shared amongst the multiple participants during the on-line collaboration meeting. Based on identities of the multiple participants and identities of shared content, the conference management application 140 generates an access policy 125 for the content shared during the on-line collaboration meeting.

In one example embodiment, the access policy 125 is available and/or used subsequent to termination of the on-line collaboration meeting to limit and/or control distribution of the shared content after a respective on-line collaboration meeting.

By way of a non-limiting example, the access policy 125 can indicate identities of the multiple participants and the content shared amongst the multiple participants during the on-line collaboration meeting. Subsequent to termination of the on-line collaboration meeting, the access policy 125 can be utilized to prevent unauthorized access to the shared content. For example, the conference management application 140, or other resource providing access control via the created access policy 125, can receive a request from a first user in computer network environment 100 to access a particular content such as a document shared during the on-line collaboration meeting. First, the conference management application 140 checks to determine whether the first user was a participant at the on-line collaboration meeting. The access policy 125 can specify whether the first user was in attendance or not. Additionally, responsive to detecting that the first user attended the on-line collaboration meeting as specified by the access policy 125, the conference management application 140 provides access to the particular document to the first user. In one embodiment, the server 115 stores a copy of shared content in repository 180. The first user retrieves the content from repository 180 for viewing on a respective computer.

The conference management application 140 also can receive a request from a second user to access the particular document shared during the on-line collaboration meeting. Responsive to detecting that the second user did not attend the on-line collaboration meeting as indicated by the access policy 125, although the second user may have been invited to the on-line collaboration meeting, the conference management application 140 can prevent the second user from accessing the particular document. Accordingly, one embodiment herein includes tracking which persons participated in an on-line collaboration meeting and creating an access policy 125 so that only participants of the on-line collaboration meeting can access the shared content. In other words, the access policy can be used to identify persons that did not attend the meeting and prevent such persons from accessing the content shared in the meeting even though the persons may have been invited to the on-line collaboration meeting.

In addition to access control, embodiments herein are useful for managing on-line meetings and corresponding content so that users are able to retrieve such information at a later date if necessary. For example, audio and video presented in the on-line collaboration meeting can be stored along with other information such as the persons who attended the meeting, corresponding access rights, content that was shared during the meeting, etc. Additional information such as an originator of the content and permission levels can be stored for the content.

The information shared between users at a meeting can be processed by the management system as discussed herein to categorize the content. For example, the management system can perform content recognition and then categorize the content shared at the meeting. As previously discussed, storage and dissemination of the shared content can be done in accordance with the access policy as discussed above and below. Thus, the purpose of the access policy is not limiting.

Further, note that embodiments herein can include open invites to meetings that can be distributed to others. For example, the host can initiate distribution of a link to persons who are directly invited to attend an on-line collaboration meeting. The direct invites can further the invitation to attend the meeting to guests who are also able to attend the on-line collaboration meeting.

In further embodiments, during generation of the access policy 125, the conference management application 140 can store status information associated with the multiple participants attending or who participated in the on-line collaboration meeting. First stored status information can indicate that a first participant is a direct invitee that was sent a link to attend the on-line collaboration meeting. A direct invite is a person or entity that has been sent a link to participate in the on-line collaboration meeting.

The direct invitee may be afforded high-level privileges for viewing content shared in the on-line collaboration meeting. For example, as mentioned above, in certain cases, the direct invitee can be allowed to retrieve and view the content shared in the on-line collaboration meeting. The guest participants, such as persons or entities invited by the direct invite to attend the on-line collaboration meeting, may be assigned a lower privilege level for viewing content shared during the on-line collaboration meeting. In other words, the guests may be able to attend a meeting via use of a received meeting link, but may have only limited rights or no rights for viewing the shared content during a respective meeting. Thus, second stored status information can indicate that a second participant is a guest invited by the direct invite to attend the on-line collaboration meeting.

In one embodiment, the conference management application 140 generates the access policy 125 to indicate that the direct invite in the present example is afforded access to content shared content before, during, or after the meeting and that the guest is prevented from accessing the shared content even though the guest may have attended the meeting. Accordingly, subsequent to the on-line collaboration meeting, the conference management application 140 can receive a request from a first participant to access the content shared amongst the participants in the on-line collaboration meeting and, in accordance with the access policy 125, grant the first participant access to the content shared during the on-line collaboration meeting. In accordance with the access policy, the conference management application 140 can deny the second participant access to the content subsequent to the on-line collaboration meeting because of a status assigned to the second participant.

As previously discussed, an individual such as a host scheduling the on-line collaboration meeting can provide input through computer 110-1 to server 115 specifying access privilege levels of the meeting attendees. In such an embodiment, the conference management application 140 can receive input specifying which particular users will be able to attend the on-line collaboration meeting. Additional input from the host can specify different participant access levels assigned each of the users for viewing content that is shared during the on-line collaboration meeting. For example, a first participant access level can enable a respective participant of the on-line collaboration meeting to retrieve and view any content that is shared in the on-line collaboration meeting, a second participant access level can enable a respective participant of the on-line collaboration meeting to retrieve and view only certain content shared in the meeting, a third participant access level can prevent a respective participant of the on-line collaboration meeting from retrieving and viewing any of the content shared in the meeting, and so on. Accordingly, the individual such as a host managing or sponsoring the on-line collaboration meeting can restrict access to content shared in the meeting.

Note that the input from a host or other entity can be expanded to include permission information indicating which of multiple participants invited to an on-line collaboration meeting can preview content that will discussed at the on-line collaboration meeting. In certain embodiments, an access policy 125 can be generated before the respective on-line collaboration meeting.

The shared content in can include files, documents, images, slide show presentations, etc., that are distributed to one or more of the participants during the on-line collaboration meeting as an attachment.

In another example embodiment, the host can specify that a particular group of persons are able to participate in the meeting and view the shared content. However, a privilege level assigned to the particular group for viewing the shared content after the on-line collaboration meeting can be restricted. For example, although the particular group of persons is able to participate in the meeting and view the shared content during the meeting, such users can be prevented from viewing the shared content subsequent to the meeting. Accordingly, embodiments herein can include, during an on-line collaboration meeting, initiating display of content to a particular participant of the meeting. After the on-line collaboration meeting, even though the particular participant attended the meeting, the access policy 140 can be used to prevent distribution of the content to the particular participant.

In other cases, as mentioned, the host can invite certain persons to the meeting. Those persons that do not attend the meeting may be allowed to view a recording of the meeting. However, because a particular invited person did not attend the on-line collaboration meeting at a particular time when it was presented, that user that did not attend the meeting can be prevented from viewing or retrieving a copy of the shared content even though such a person may be allowed to view unrestricted portions of the recorded meeting other than protected, shared content.

By way of a non-limiting example, the server 115 can be a centralized server in a computer network environment 100 that facilitates display of the on-line collaboration meeting including the multiple participants for viewing at computers 110. However, note that the functionality as discussed herein can be distributed through the network at computers 110 or other resources and yet achieve the same result.

Figure 2:
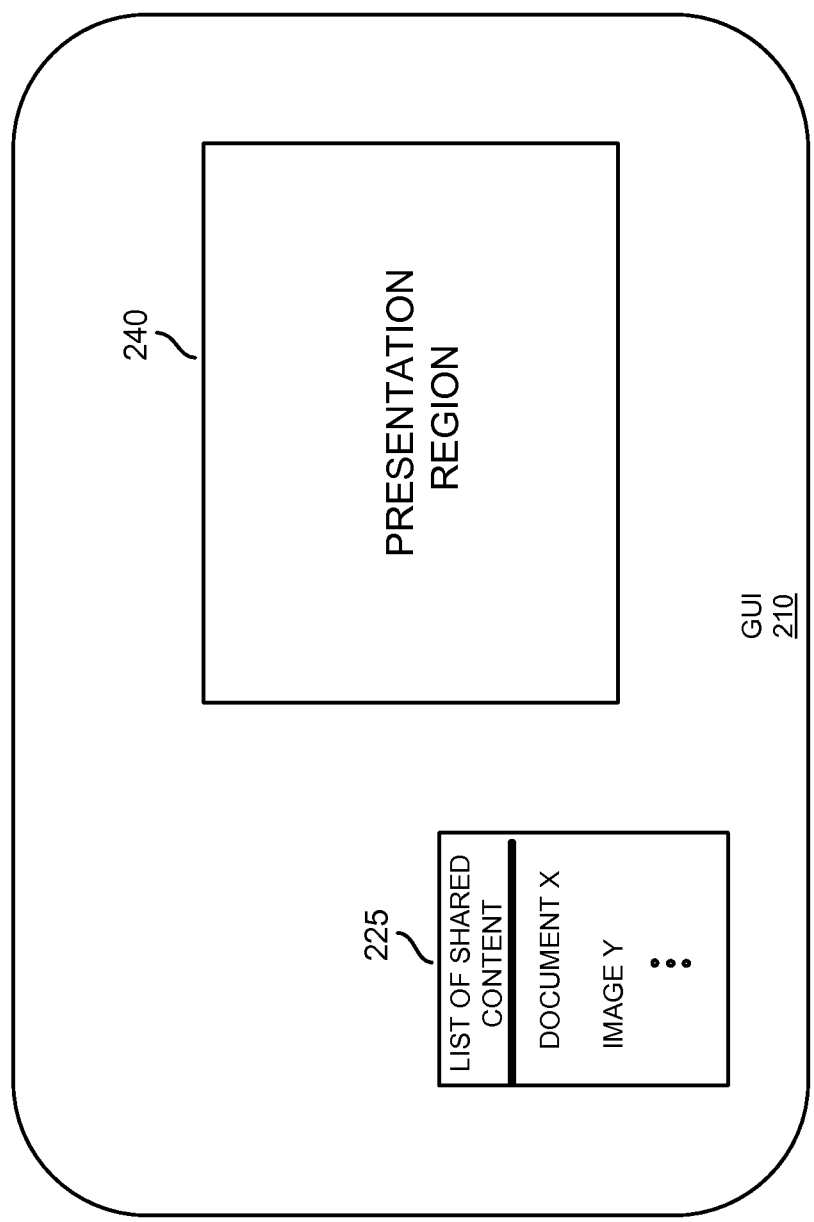
FIG. 2 is an example diagram illustrating a user interface for attending or participating an on-line collaboration meeting according to embodiments herein.

FIG. 2 is an example diagram illustrating a graphical user interface 210 displayed at a respective client computer of a user attending an on-line collaboration meeting according to embodiments herein. By way of a non-limiting example, graphical user interface 210 includes a viewing region 225 to display a listing of content shared at the on-line collaboration meeting. In one embodiment, if a user has appropriate access rights, the user viewing graphical user interface 210 can open and view the shared content during the host's presentation in a separate window of graphical user interface 210. Accordingly, a user can view the presentation in one window and the shared content in another window if so desired.

Graphical user interface 210 includes a viewing region 240 for viewing a presentation by host at computer 110-1. By way of a non-limiting example, note that a portion of graphical user interface 210 can be configured as a window or viewing region for displaying a shared whiteboard that is viewed by each of the participants. Content can be dragged and dropped into the collaborative whiteboard to share content with other participants in an on-line collaboration meeting. More details of an example collaborative whiteboard and functionality are described in U.S. patent application Ser. No. 11/204,777, the entire teachings of which are incorporated herein by this reference. In general, this application describes a system in which content can be dragged and dropped into a shared whiteboard for viewing by other members that participate in a collaborative whiteboard session.

Referring again to FIG. 1, display of the on-line collaboration meeting at client computers 110 operated by the participants can include displaying viewing region 225 in graphical user interface 210 at the client computers 110 to indicate an identity of content that is selected by a presenter and shared for viewing in the on-line collaboration meeting.

The management system can record the on-line collaboration meeting attended by multiple participants. Subsequent to storing the on-line collaboration meeting, the conference management application 140 can receive a request from a given participant of the multiple participants attending or who participated in the meeting to view the recording. In response to receiving the request, based on the access policy 125, the conference management application 140 can provide the given participant access to the recording. In one embodiment, the server 115 stores the recording of the meeting and/or other information as discussed herein in repository 180.

Providing access to the recording can include initiating playback of the recording at a client computer operated by the given participant. Playback of the recording at the client computer can include display of a viewing region 225 on a display screen at the client computer. The viewing region 225 can be used to display the identities of content shared amongst the multiple participants during the on-line collaboration meeting. Thus, a user viewing the recorded on-line collaboration meeting can be apprised of the different content shared during the meeting. In response to receiving a request from the given participant viewing the recording to retrieve a particular document listed in the viewing region 225, the conference management application 140 can initiate distribution of the particular content to the given participant.

To notify one or more participant of the on-line collaboration meeting that shared content is available for viewing after a meeting, the conference management application 140 and/or link distribution manager 120 can be configured to initiate distribution of a link to the multiple participants. The link can include an address from which to retrieve and view the recording of the on-line collaboration meeting. Accordingly, embodiments herein can further include, subsequent to the on-line collaboration meeting, initiating distribution of a link to the multiple participants. The link can include an address from which to retrieve a recording of the on-line collaboration meeting. In response to receiving a request from a given participant to access the recording of the on-line collaboration meeting via use of the link by the given participant, the conference management application 140 can verify credentials of the given participant prior to distribution of the content shared during the on-line collaboration meeting. In other words, upon receiving a request to access a recorded on-line meeting, the conference management application 140 can request that the requestor provide an appropriate username and password.

In addition to, or as an alternative to, distributing the link to retrieve the recording, embodiments herein can include initiating distribution of a link specifying a location from which to retrieve the content shared during the on-line collaboration meeting. In this latter embodiment, a user can access the content shared in the meeting without having to retrieve the recorded on-line collaboration meeting.

Figure 3:
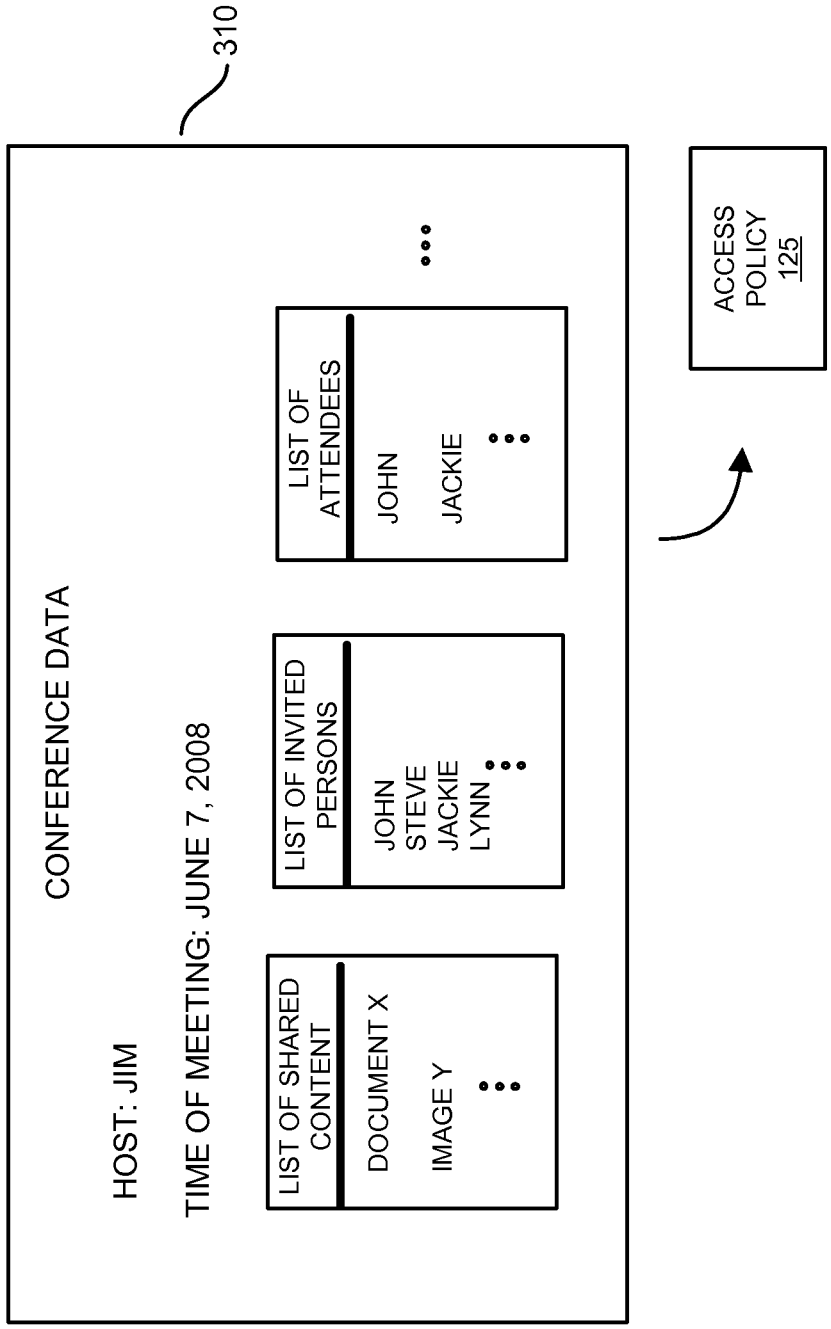
FIG. 3 is an example diagram illustrating generation of an access policy according to embodiments herein.

FIG. 3 is an example diagram illustrating generation of an access policy according to embodiments herein. As shown, the conference management application 140 can keep track of information associated with the on-line collaboration meeting. For example, the information can indicate a name of the host, time of meeting, etc. The information also can indicate content that was shared during the respective on-line collaboration meeting, persons invited to the meeting, list of attendees, access permission supplied by a respective host, etc. Based on this information, the conference management application 140 generates access policy 125.

As mentioned above, certain embodiments can enable the participants of the meeting to specify which participants of the on-line collaboration meeting are able to view the content that they share in the on-line collaboration meeting. Such users can specify which persons in the meeting will be allowed access to their content. In such an embodiment, the conference management application 140 can generate the access policy 125 in accordance with the permission settings provided by the participants in addition to the access permissions as specified by the host.

Note further that the conference management application 140 as discussed herein can, before, during, or after the on-line collaboration meeting, prompt a host at computer 110-1 for a listing of which of the multiple participants to provide access to the content shared in the meeting. Based on input from the host specifying the listing of persons to be provided access, the conference management application 140 can generate the access policy 125 to allow only the members on the listing to access the shared content and/or recording of the on-line collaboration meeting.

In other embodiments, as mentioned above, the conference management application 140 can generate the access policy 140 depending on which persons participated in the on-line collaboration meeting. Thus, in one embodiment, the rights management server 115 can create an access policy 125 for respective content so that only participants of the on-line collaboration meeting are able to access content shared in the meeting.

Figure 4:
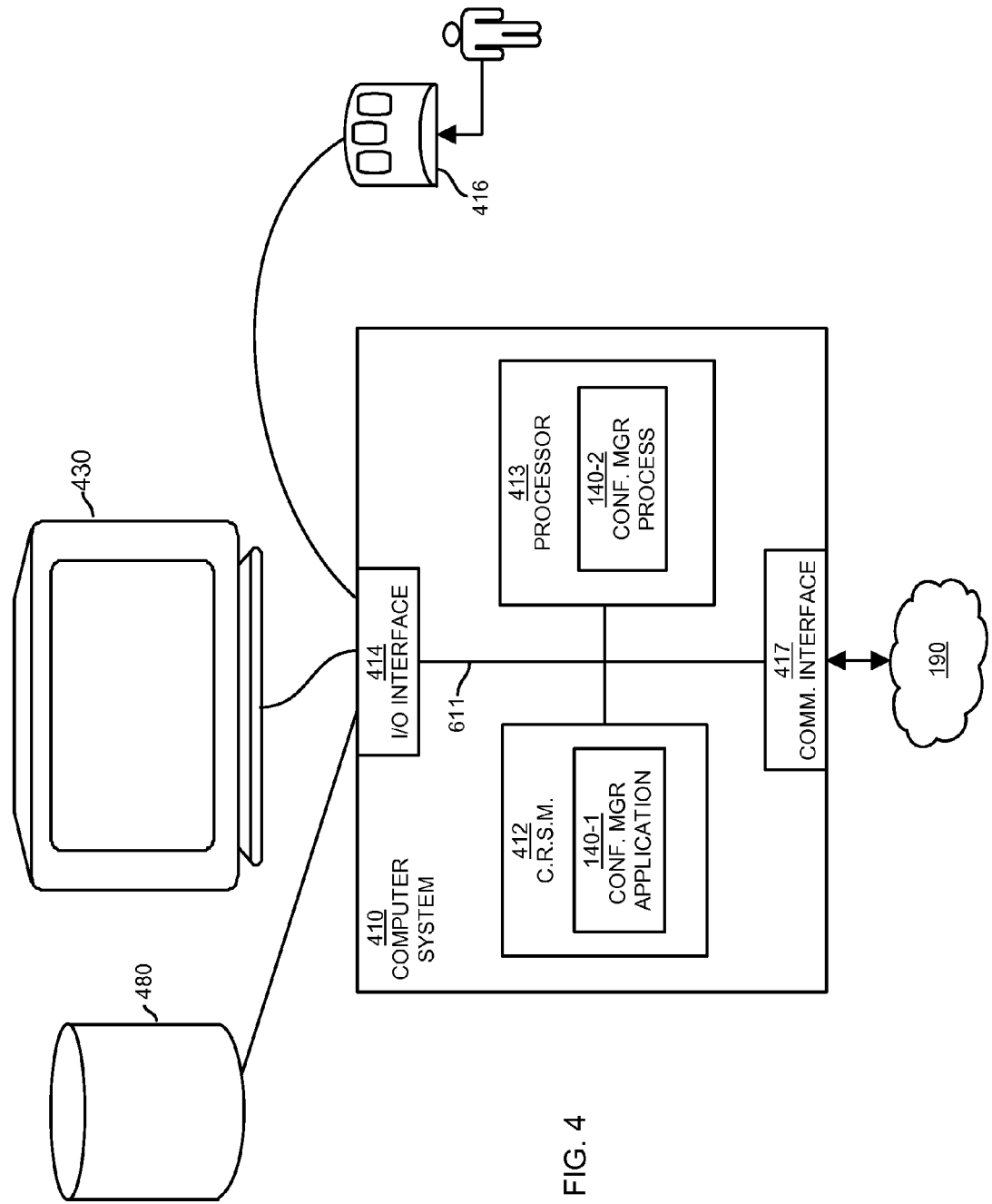
FIG. 4 is a diagram illustrating an example computer architecture for executing a conference management application according to embodiments herein.

FIG. 4 is a block diagram of an example environment including an architecture of a respective computer system 410 for implementing functions provided by resources such as server 115 or computers 110 according to embodiments herein.

Computer system 410 can be a computerized device such as a personal computer, workstation, portable computing device, console, network terminal, processing device, network device, etc., operating as a server, client, etc.

Note that the following discussion provides a basic embodiment indicating how to carry out functionality associated with conference management application 140-1. It should be noted that the actual configuration for carrying out the operations as described herein can vary depending on a respective application.

As shown, computer system 410 of the present example includes an interconnect 411 that couples computer readable storage media 412, a processor 413, I/O interface 414, and a communications interface 417. I/O interface 414 provides connectivity to peripheral devices 416, if such devices are present, such as a keyboard, repository 480, a computer mouse, display screen 430, etc.

Computer readable storage medium 412 can be any suitable device to store data such as memory, optical storage, hard drive, floppy disk, etc.

Communications interface 417 enables computer system 410 and, more particularly, conference management application 140-1 to communicate over network 190 to retrieve information from remote sources and communicate with client computers as described herein. 110 interface 414 also enables the conference management application 140-1 to retrieve locally stored information from repository 480.

As shown, computer readable storage media 412 can be encoded with conference management application 140-1 that supports functions as discussed above and as discussed further below. In an example embodiment, the conference management application 140-1 can be embodied as software code such as data and/or logic instructions. When executed, the code stored on computer storage media 412 can support processing functionality according to different embodiments described herein.

During operation of one embodiment, processor 413 accesses computer readable storage media 412 via the use of interconnect 411 in order to launch, run, execute, interpret or otherwise perform the logic instructions of the conference management application 140-1. Execution of the conference management application 140-1 produces processing functionality in conference management process 140-2. In other words, the conference management process 140-2 represents one or more aspects of the conference management application 140-1 performing within or upon the processor 413 in the computer system 410.

It should be noted that, in addition to the conference management process 140-2 that carries out method operations as discussed herein, other embodiments herein include the conference management application 140-1 itself such as the un-executed or non-performing logic instructions and/or data. As mentioned, the conference management application 140-1 may be stored on computer readable storage media 412 such as a floppy disk, hard disk, optical media, etc. According to other embodiments, the conference management application 140-1 can also be stored on a computer readable storage media such as a memory type system such as in firmware, read only memory (ROM), or, as in this example, as executable code.

In addition to these embodiments, it should also be noted that other embodiments herein include the execution of the functionality as described herein via processor 413. Thus, those skilled in the art will understand that the computer system 410 can include other processes and/or software and hardware components, such as an operating system that controls allocation and use of hardware resources.

As mentioned above, the computer system 410 can support execution of conference management application 140-1 according to embodiments herein. It should be noted that a similar type of computer architecture with a processor, memory, and executable software instructions can be used to support execution of the clients or other functionality as described herein. Thus, each of clients also can be a computer system configured with computer readable storage medium for storing executable instructions as well as a corresponding processor to retrieve and execute the stored instructions.

Note that the techniques described herein may be implemented by a computer system configured to provide the functionality described. FIG. 4 is thus a block diagram illustrating one embodiment of a computer system 410 configured to implement the methods described herein. In accordance with different embodiments, computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by computer system 410 and, more particularly, functionality associated with the conference management application 140 will now be discussed via flowcharts in FIGS. 5-9. As discussed above, the conference management application 140 executed by one or more computers 110 in computer network environment 100 can be configured to execute the steps in the flowcharts.

Note that there will be some overlap with respect to concepts discussed above for FIGS. 1 through 4. Also, note that the steps in the below flowcharts need not always be executed in the order shown. The steps can be executed in any suitable order.

Figure 5:
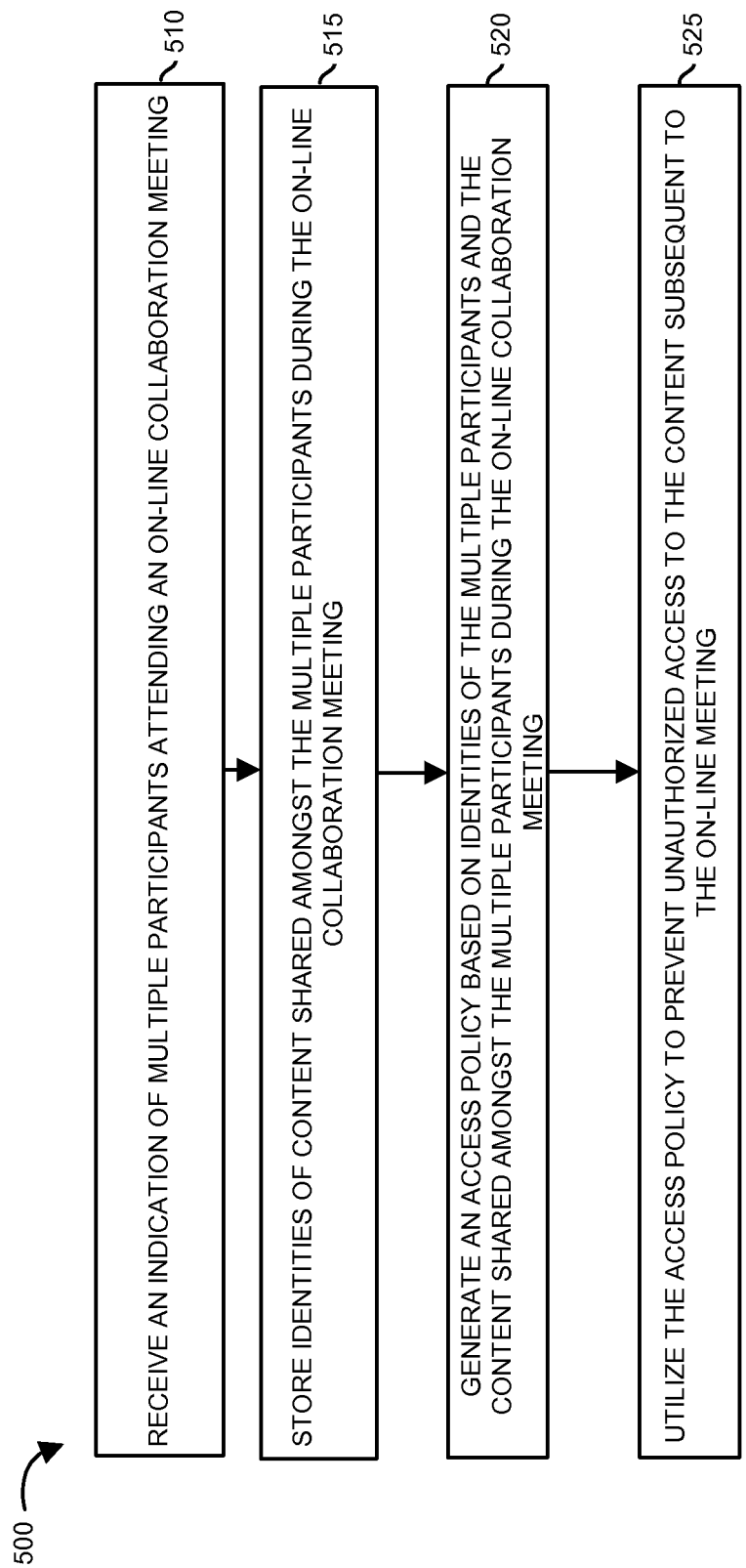
FIG. 5 is a flowchart illustrating an example method of generating an access policy according to embodiments herein.

FIG. 5 is a flowchart 500 illustrating a technique of managing an on-line meeting according to embodiments herein.

In step 510, the conference management application 140 receives an indication of multiple participants attending or who participated in an on-line collaboration meeting.

In step 515, the conference management application 140 stores identities of content shared amongst the multiple participants during the on-line collaboration meeting.

In step 520, the conference management application 140 generates an access policy 125 based on identities of the multiple participants and the content shared amongst the multiple participants during the on-line collaboration meeting.

In step 525, the conference management application 140 utilizes the access policy 125 to prevent unauthorized access to the content subsequent to the on-line meeting.

Figure 6:
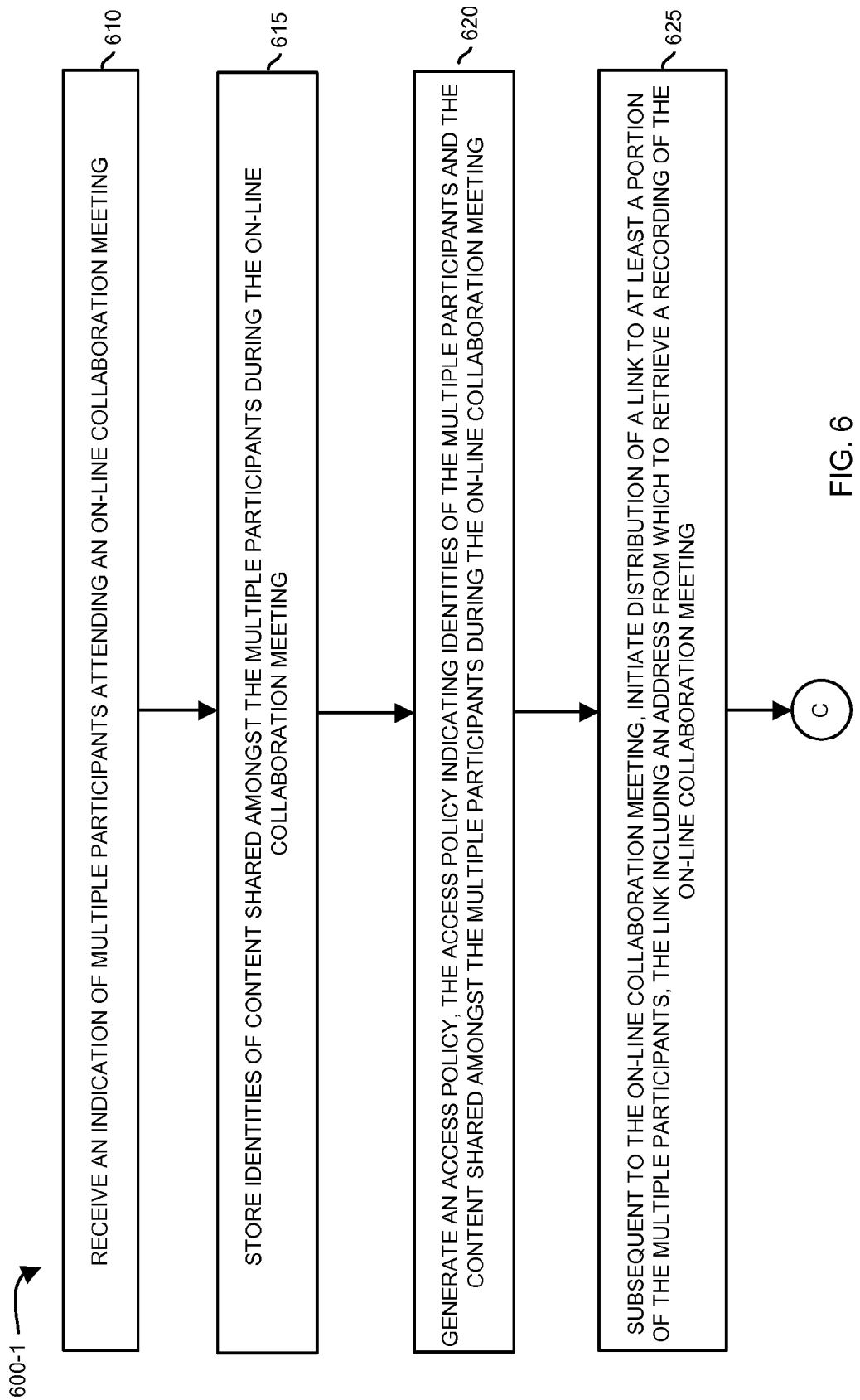
FIGS. 6 and 7 combine to form a flowchart illustrating an example method related to generation of an access policy according to embodiments herein.
Figure 7:
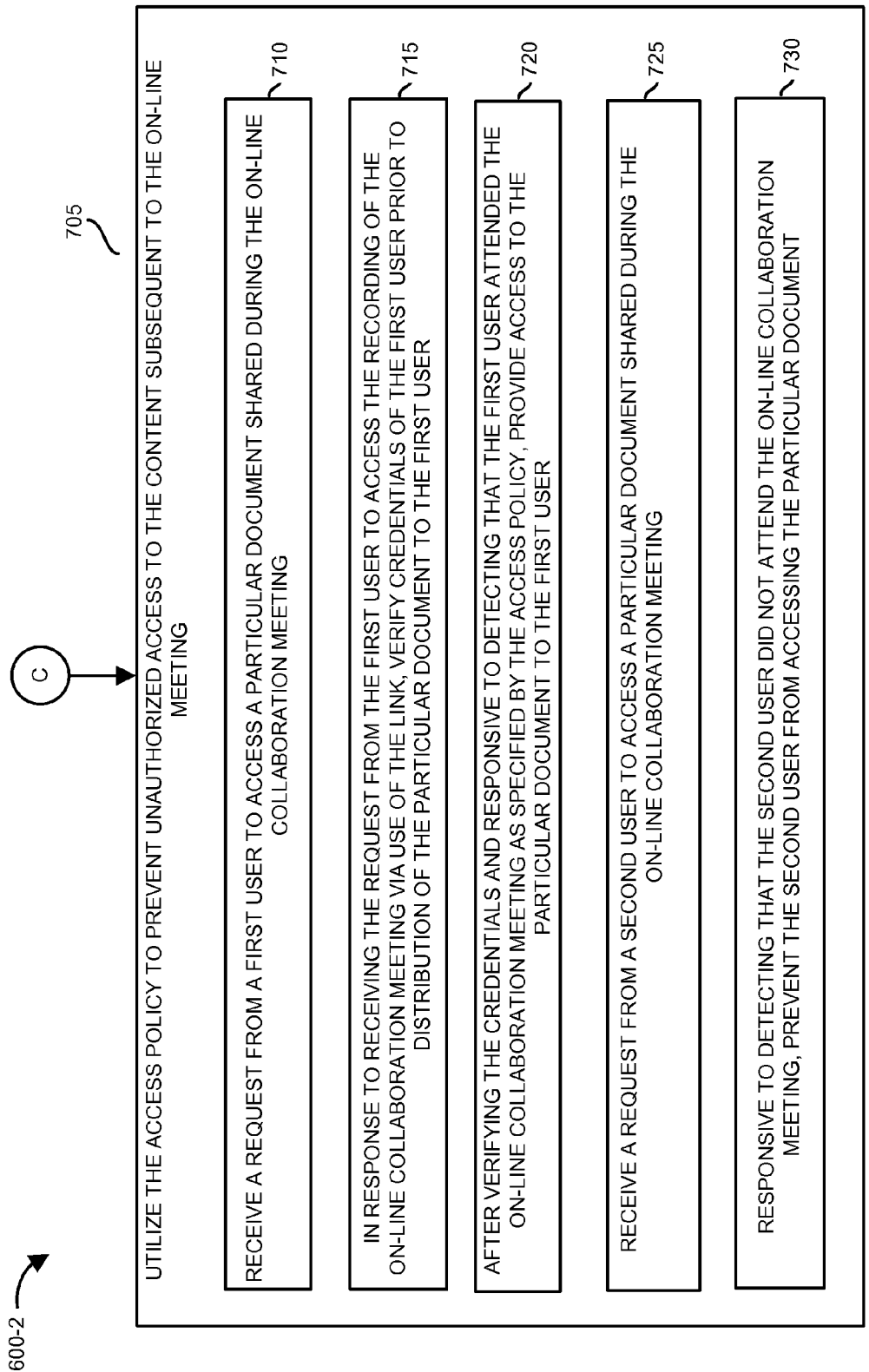

FIGS. 6 and 7 combine to form a more detailed flowchart 600 (e.g., flowchart 600-1 and flowchart 600-2) illustrating a method according to embodiments herein.

In step 610, the conference management application 140 receives an indication of multiple participants attending or who participated in an on-line collaboration meeting.

In step 615, the conference management application 140 stores identities of content shared amongst the multiple participants during the on-line collaboration meeting.

In step 620, the conference management application 140 generates an access policy 125. The access policy 125 indicates identities of the multiple participants and the content shared amongst the multiple participants during the on-line collaboration meeting.

In step 625, subsequent to the on-line collaboration meeting, the conference management application 625 initiates distribution of a link to at least a portion of the multiple participants in the on-line meeting. The link includes an address from which to retrieve a recording of the on-line collaboration meeting or the shared content in the on-line collaboration meeting.

In step 705 in FIG. 7, the conference management application 140 utilizes the access policy to prevent unauthorized access to the content subsequent to the on-line meeting.

For example, in sub-step 710, the conference management application 140 receives a request from a first user in computer network environment 100 to access a particular document shared during the on-line collaboration meeting.

In step 715, in response to receiving the request from the first user to access the recording of the on-line collaboration meeting via use of the link, the conference management application 140 verifies credentials of the first user prior to distribution of the particular document to the first user.

In step 720, after verifying the credentials and responsive to detecting that the first user attended the on-line collaboration meeting as specified by the access policy, the conference management application 140 provides access to the particular document to the first user.

In step 725, the conference management application 140 receives a request from a second user to access a particular document shared during the on-line collaboration meeting.

In step 735, responsive to detecting that the second user did not attend the on-line collaboration meeting, the conference management application 140 prevents the second user from accessing the particular document.

Figure 8:
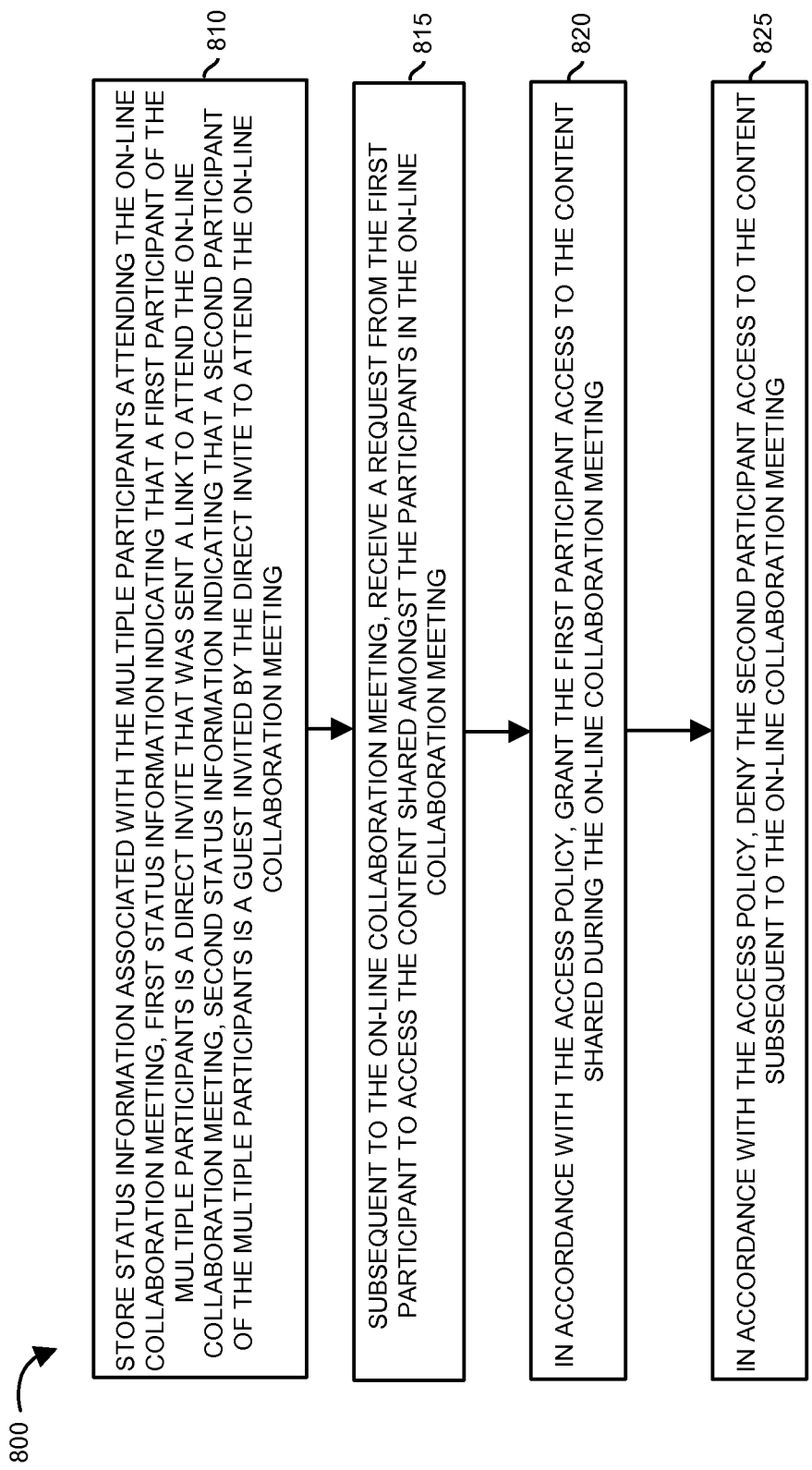
FIG. 8 is a flowchart illustrating an example method related to generation of an access policy according to embodiments herein.

FIG. 8 is a flowchart 800 illustrating a technique of managing an on-line meeting according to embodiments herein.

In step 810, the conference management application 140 stores status information associated with the multiple participants attending or who participated in the on-line collaboration meeting. First status information indicates that a first participant of the multiple participants is a direct invite that was sent a link to attend the on-line collaboration meeting. Second status information indicates that a second participant of the multiple participants is a guest invited by the direct invite to attend the on-line collaboration meeting.

In step 815, subsequent to the on-line collaboration meeting, the conference management application 140 receives a request from the first participant to access the content shared amongst the participants in the on-line collaboration meeting In step 820, in accordance with the access policy, the conference management application 140 grants the first participant access to the content shared during the on-line collaboration meeting.

In step 825, in accordance with the access policy, the conference management application 140 denies the second participant access to the content subsequent to the on-line collaboration meeting.

FIG. 9 is a flowchart 900 illustrating a technique of managing an on-line meeting according to embodiments herein.

In step 910, the conference management application 140 initiates display of the on-line collaboration meeting to the multiple participants for viewing. Display of the on-line collaboration meeting includes an identity of a document selected by a host of the on-line collaboration meeting. The host of the on-line collaboration meeting makes the document available to the multiple participants through the on-line collaboration meeting.

In step 915, the conference management application 140 records the on-line collaboration meeting.

In step 920, subsequent to the on-line collaboration meeting, the conference management application 140 receives a request from a given participant of the multiple participants to view the recording.

In step 925, in response to receiving the request, the conference management application 140 provides the given participant access to the recording.

In step 930, the conference management application 140 initiates and/or enables playback of the recording at a client computer operated by the given participant. Playback of the recording at the client computer includes display of a viewing region 225 on a display screen at the client computer. The viewing region 225 can be allocated to display the identities of content shared amongst the multiple participants during the on-line collaboration meeting.

In step 935, in response to receiving a request from the given participant viewing the recording to retrieve a particular document listed in the viewing region 225, the conference management application 140 initiates distribution of the particular document to the given participant.

Note again that techniques herein are well suited for management of on-line meetings as described herein. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:

receiving an indication of invitees to an online collaboration meeting, participants among the invitees who participated in the online collaboration meeting, and respective status information associated with each of the invitees, the status information including a type of meeting invitation sent to each invitee, wherein the type of meeting invitation sent to each invitee is one of a direct invite and a quest invite;

storing identities of items of content shared amongst the participants during the on-line collaboration meeting;

storing the status information associated with the participants among the invitees who participated in the on-line collaboration meeting, first status information indicating that a first participant of the participants is a direct invite among the invitees that was sent a link to attend the on-line collaboration meeting, and second status information indicating that a second participant of the participants is a quest invite among the invitees that was invited by the direct invite to attend the on-line collaboration meeting, wherein a privilege level for the second participant is lower than a privilege level for the first participant;

generating an access policy indicating the status information for each of the invitees, and identifying the items of content shared amongst the participants during the on-line collaboration meeting, the generating comprising specifying, in the access policy, respective privilege levels for each of the invitees, the privilege levels being based at least in part on the type of meeting invitation sent to each invitee and controlling access to the items of content during and after the on-line collaboration meeting; and subsequent to termination of the on-line collaboration meeting, responsive to receiving a request from the first participant or the second participant to access an item of content shared during the on-line collaboration meeting:

utilizing the access policy to determine whether the first participant or the second participant has a privilege level to access the item of content that was shared amongst the participants during the on-line collaboration meeting;

in accordance with a privilege level for the first participant specified in the access policy, granting the first participant access to the item of content shared amongst the participants during the on-line collaboration meeting; and in accordance with a privilege level for the second participant specified in the access policy, denying the second participant access to the item of content.

2. The method as in claim 1, wherein receiving a request from the invitee comprises receiving a request from a first invitee to access a particular document shared during the on-line collaboration meeting; and wherein providing access comprises responsive to detecting, based on status information associated with the first invitee, that the first invitee is one of the participants who participated in the on-line collaboration meeting, providing access to the particular document to the first invitee in accordance with a privilege level for the first invitee specified in the access policy.

3. The method as in claim 2, wherein receiving a request from the invitee comprises receiving a request from a second invitee to access a particular document shared during the on-line collaboration meeting; and wherein providing access comprises responsive to detecting, based on status information associated with the second invitee, that the second invitee is not one of the participants who participated in the on-line collaboration meeting, preventing the second invitee from accessing the particular document.

4. The method as in claim 1, wherein generating the access policy occurs in response to termination of the on-line collaboration meeting.

5. The method as in claim 1 further comprising:

initiating display of the on-line collaboration meeting to the participants for viewing, display of the on-line collaboration meeting including an identity of a document selected by a presenter of the on-line collaboration meeting, the presenter in the on-line collaboration meeting making the document available to the participants through the on-line collaboration meeting;

recording the on-line collaboration meeting;

subsequent to the on-line collaboration meeting, receiving a request from a given participant of the participants to view the recording; and in response to receiving the request, providing the given participant access to the recording in accordance with a privilege level for the given participant specified in the access policy.

6. The method as in claim 5, wherein providing access to the recording includes:

initiating playback of the recording at a client computer operated by the given participant, playback of the recording at the client computer including display of a viewing region on a display screen at the client computer, the viewing region allocated to display the identities of the items of content shared amongst the participants during the on-line collaboration meeting; and in response to receiving a request from the given participant viewing the recording to retrieve a particular document listed in the viewing region, initiating distribution of the particular document to the given participant.

7. The method as in claim 6 further comprising:

subsequent to the on-line collaboration meeting, initiating distribution of a link to the participants, the link including an address from which to retrieve the recording of the on-line collaboration meeting.

8. The method as in claim 1 further comprising:

subsequent to the on-line collaboration meeting, initiating distribution of a link to the participants, the link including an address from which to retrieve a recording of the on-line collaboration meeting; and in response to receiving a request from a given participant to access the recording of the on-line collaboration meeting via the link, verifying credentials of the given participant prior to distribution of the content to the given participant.

9. The method as in claim 1 further comprising:

subsequent to the on-line collaboration meeting, initiating distribution of a link to the participants, the link specifying the access policy and a location from which to retrieve the items of content shared amongst the participants during the on-line collaboration meeting.

10. The method as in claim 1 further comprising:

receiving input from a source scheduling the on-line collaboration meeting, the input specifying that the participants are able to attend the on-line collaboration meeting, the input specifying multiple different participant privilege levels to the items of content, the items of content presented in the on-line collaboration meeting, a first participant privilege level enabling at least one participant of the participants to retrieve and view the items of content, a second participant privilege level preventing at least one participant of the participants from retrieving and viewing the items of content.

11. The method as in claim 1 further comprising:

during the on-line collaboration meeting, initiating display of the items of content to a particular participant of the participants; and after the on-line collaboration meeting, utilizing the access policy to prevent distribution of the items of content to the particular participant.

12. The method as in claim 1 further comprising:

subsequent to the on-line collaboration meeting, receiving input from a host of the on-line collaboration meeting, the input indicating which of the invitees and which of the participants to provide access to the shared items of content; and generating the access policy in accordance with the input.

13. The method as in claim 1 further comprising:

applying the access policy to the items of content; and
providing access to the items of content based on application of the access policy.

14. A non-transitory computer-readable storage medium having instructions stored thereon for processing data information, that when executed by a processing device, cause the processing device to perform operations comprising:

receiving an indication of invitees to an online collaboration meeting, participants among the invitees who participated in the online collaboration meeting, and respective status information associated with each of the invitees, the status information including a type of meeting invitation sent to each invitee, wherein the type of meeting invitation sent to each invitee is one of a direct invite and a guest invite;

storing identities of items of content shared amongst the participants during the on-line collaboration meeting;

storing the status information associated with the participants among the invitees who participated in the on-line collaboration meeting, first status information indicating that a first participant of the participants is a direct invite among the invitees that was sent a link to attend the on-line collaboration meeting, and second status information indicating that a second participant of the participants is a guest invite among the invitees that was invited by the direct invite to attend the on-line collaboration meeting, wherein a privilege level for the second participant is lower than a privilege level for the first participant;

generating an access policy indicating the status information for each of the invitees, and identifying items of content shared amongst the participants during the on-line collaboration meeting, the generating comprising specifying, in the access policy, respective privilege levels for each of the invitees, the privilege levels being based at least in part on the type of meeting invitation sent to each invitee and controlling access to the items of content during and after the on-line collaboration meeting; and subsequent to termination of the on-line collaboration meeting, responsive to receiving a request from the first participant or the second participant to access an item of content shared during the on-line collaboration meeting:
  utilizing the access policy to determine whether the first participant or the second participant has a privilege level to access the item of content that was shared amongst the participants during the on-line collaboration meeting;
  in accordance with a privilege level for the first participant specified in the access policy, granting the first participant access to the item of content shared amongst the participants during the on-line collaboration meeting; and
  in accordance with a privilege level for the second participant specified in the access policy, denying the second participant access to the item of content.

15. The non-transitory computer-readable storage medium as in claim 14, wherein receiving a request from the invitee comprises receiving a request from a first invitee to access a particular document shared during the on-line collaboration meeting; and
  wherein providing access comprises responsive to detecting, based on status information associated with the first invitee, that the first invitee is one of the participants who participated in the on-line collaboration meeting, providing access to the particular document to the first invitee.

16. The non-transitory computer-readable storage medium as in claim 15, wherein receiving a request from the invitee comprises receiving a request from a second invitee to access a particular document shared during the on-line collaboration meeting; and
  wherein providing access comprises responsive to detecting, based on status information associated with the second invitee, that the second invitee did not participate in the on-line collaboration meeting, preventing the second invitee from accessing the particular document.

17. The non-transitory computer-readable storage medium as in claim 14, the operations further comprising:
  initiating display of the on-line collaboration meeting to the participants for viewing, display of the on-line collaboration meeting including an identity of a document selected by a presenter of the on-line collaboration meeting, the presenter in the on-line collaboration meeting making the document available to the participants through the on-line collaboration meeting;
  recording the on-line collaboration meeting;
  subsequent to the on-line collaboration meeting, receiving a request from a given participant of the participants to view the recording; and
  in response to receiving the request, providing the given participant access to the recording;
  initiating playback of the recording at a client computer operated by the given participant, playback of the recording at the client computer including display of a viewing region on a display screen at the client computer, the viewing region allocated to display the identities of the items of content shared amongst the participants during the on-line collaboration meeting; and
  in response to receiving a request from the given participant viewing the recording to retrieve a particular document listed in the viewing region, initiating distribution of the particular document to the given participant.

18. The non-transitory computer-readable storage medium as in claim 17 further including instructions stored thereon that when carried out by the processing device enables operations of:
  subsequent to the on-line collaboration meeting, initiating distribution of a link to the participants, the link including an address from which to retrieve the recording of the on-line collaboration meeting.

19. The non-transitory computer-readable storage medium as in claim 14 further including instructions stored thereon that when carried out by the processing device enables operations of:
  subsequent to the on-line collaboration meeting, initiating distribution of a link to the participants, the link specifying a location from which to retrieve the items of content shared amongst the participants during the on-line collaboration meeting.

20. The non-transitory computer readable storage medium as in claim 14, the operations further comprising:
  receiving input from a source scheduling the on-line collaboration meeting, the input specifying that the participants are able to attend the on-line collaboration meeting, the input specifying multiple different participant privilege levels to the items of content, the items of content presented in the on-line collaboration meeting, a first participant privilege level enabling at least one participant of the participants to retrieve and view the items of content, a second participant privilege level preventing at least one participant of the participants from retrieving and viewing the items of content.

21. The non-transitory computer readable storage medium as in claim 14, the operations further comprising:
  subsequent to the on-line collaboration meeting, receiving input from a host of the on-line collaboration meeting, the input indicating which of the participants to provide access to the shared items of content; and
  generating the access policy in accordance with the input.

22. A computer system comprising:
  a processor;
  a memory unit that stores instructions associated with an application executed by the processor; and
  an interconnect coupling the processor and the memory unit, enabling the computer system to execute the application and perform operations of:
    receiving an indication of invitees to an online collaboration meeting, participants among the invitees who participated in the online collaboration meeting, and respective status information associated with each of the invitees, the status information including a type of meeting invitation sent to each invitee, wherein the type of meeting invitation sent to each invitee is one of a direct invite, and a guest invite;
    storing identities of items of content shared amongst the participants during the on-line collaboration meeting;
    storing the status information associated with the participants among the invitees who participated in the on-line collaboration meeting, first status information indicating that a first participant of the participants is a direct invite among the invitees that was sent a link to attend the on-line collaboration meeting, and second status information indicating that a second participant of the participants is a guest invite among the invitees that was invited by the direct invite to attend the on-line collaboration meeting, wherein a privilege level for the second participant is lower than a privilege level for the first participant;

generating an access policy indicating the status information for each of the invitees, and identifying the items of content shared amongst the participants during the on-line collaboration meeting, the generating comprising specifying, in the access policy, respective privilege levels for each of the invitees, the privilege levels being based at least in part on the type of meeting invitation sent to each invitee and controlling access to the items of content during and after the on-line collaboration meeting; and subsequent to termination of the on-line collaboration meeting, responsive to receiving a request from the first participant or the second participant to access an item of content shared during the on-line collaboration meeting:

utilizing the access policy to determine whether the first participant or the second participant has a privilege level to access the item of content that was shared amongst the participants during the on-line collaboration meeting;

in accordance with a privilege level for the first participant specified in the access policy, granting the first participant access to the item of content shared amongst the participants during the on-line collaboration meeting; and in accordance with a privilege level for the second participant specified in the access policy, denying the second participant access to the item of content.

\* \* \* \* \*